United States Patent
Hirokawa et al.

(10) Patent No.: US 12,033,427 B2
(45) Date of Patent: Jul. 9, 2024

(54) STRIPE PATTERN IMAGE COLLATING DEVICE, STRIPE PATTERN COLLATING METHOD, AND COMPUTER-READABLE MEDIUM STORING PROGRAM THEREOF

(71) Applicant: NEC Corporation, Tokyo (JP)

(72) Inventors: Akira Hirokawa, Tokyo (JP); Tatsuya Shimahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/913,026

(22) PCT Filed: Mar. 27, 2020

(86) PCT No.: PCT/JP2020/014403
§ 371 (c)(1),
(2) Date: Sep. 20, 2022

(87) PCT Pub. No.: WO2021/192315
PCT Pub. Date: Sep. 30, 2021

(65) Prior Publication Data
US 2023/0144689 A1     May 11, 2023

(51) Int. Cl.
*G06V 40/12*      (2022.01)
*G06T 5/00*      (2024.01)
(Continued)

(52) U.S. Cl.
CPC ............ *G06V 40/1359* (2022.01); *G06T 5/80* (2024.01); *G06V 10/806* (2022.01); *G06T 2207/20044* (2013.01)

(58) Field of Classification Search
CPC .. G06V 40/1359; G06V 10/806; G06T 5/006; G06T 2207/20044
See application file for complete search history.

(56) References Cited

U.S. PATENT DOCUMENTS 7,151,846 B1    12/2006   Fujii
2004/0032976 A1*   2/2004   Hara .................. G06V 40/1365
                                              382/125

(Continued)

FOREIGN PATENT DOCUMENTS

JP      2001-118065 A    4/2001
JP      2004-078434 A    3/2004
(Continued)

OTHER PUBLICATIONS

International Search Report for PCT Application No. PCT/JP2020/014403, mailed on Jun. 23, 2020.
(Continued)

*Primary Examiner* — Lixi C Simpson

(57) ABSTRACT

A stripe pattern image collating device according to the example embodiment includes a feature extracting unit that extracts a feature point and a skeleton from a first stripe pattern image and a second stripe pattern image in which a stripe pattern is formed of ridges, and generates feature point data and skeleton data. A skeleton collating unit that collates two sets of pieces of the feature point data and pieces of the skeleton data that are extracted from each of the first stripe pattern image and the second stripe pattern image, and calculates a collation score. An image analyzing unit that analyzes the second stripe pattern image with respect to an area in which an opposite feature point pair of the first stripe pattern image exists, calculates an image analysis score, and corrects the collation score.

10 Claims, 21 Drawing Sheets

(51) Int. Cl.
      *G06T 5/80*       (2024.01)
      *G06V 10/80*      (2022.01)

(56) References Cited

U.S. PATENT DOCUMENTS

| | | |
|---|---|---|
| 2004/0101173 A1 | 5/2004 | Hara et al. |
| 2007/0201733 A1 | 8/2007 | Hara |
| 2007/0230754 A1* | 10/2007 | Jain .................... G06V 40/1371 |
| | | 382/125 |
| 2013/0216106 A1* | 8/2013 | Hara .................... G06V 10/993 |
| | | 382/115 |
| 2019/0205613 A1* | 7/2019 | Lo ....................... G06V 40/1371 |
| 2020/0065546 A1 | 2/2020 | Hara |

FOREIGN PATENT DOCUMENTS

| | | |
|---|---|---|
| JP | 2005-352623 A | 12/2005 |
| JP | 4030829 B2 | 1/2008 |
| JP | 4030830 B2 | 1/2008 |
| JP | 4586746 B2 | 11/2010 |
| WO | 2017/038695 A1 | 3/2017 |
| WO | 2018/079630 A1 | 5/2018 |

OTHER PUBLICATIONS

D. Maltoni et al, "Handbook of Fingerprint Recognition", Springer-Verlag London Limited 2009, pp. 97-233.
ANSI/NIST-ITL Jan. 2000 Revision of ANSI/NIST-CSL1-1993 & ANSI.NIST-ITL 1a-1997, "NIST Special Publication 500-245", [online], Jul. 27, 2000, pp. 1-81.

* cited by examiner

Outgoing Pair

Oncoming Pair

STRIPE PATTERN IMAGE COLLATING DEVICE, STRIPE PATTERN COLLATING METHOD, AND COMPUTER-READABLE MEDIUM STORING PROGRAM THEREOF

This application is a National Stage Entry of PCT/JP2020/014403 filed on Mar. 27, 2020, the contents of all of which are incorporated herein by reference, in their entirety.

TECHNICAL FIELD

The present invention relates to a stripe pattern image collating device, a stripe pattern image collating method, and a computer-readable medium storing a program thereof. In particular, the present invention relates to a stripe pattern image collating device, a stripe pattern image collating method, and a computer-readable medium storing the program thereof that collate two stripe pattern images such as a fingerprint and a palm print.

BACKGROUND ART

A fingerprint and a palm print composed of a large number of ridges having a shape with a curved stripe pattern have long been used as a means for person identification. In particular, collation using a latent fingerprint being left in a crime scene is an effective examination means. Many police agencies and the like have introduced an automated fingerprint identification system (AFIS) using a computer. In a fingerprint collation system, a person associated with a latent fingerprint is determined by collating a fingerprint image registered in a database with a feature point (also referred to as a minutia) of each of latent fingerprints collected at a crime scene or the like.

An end point and a bifurcation of a fingerprint ridge are often used as a feature point (fingerprint feature point) to be used for fingerprint collation. For example, in "4.3 Minutiae-Based Methods" of Non-Patent Literature 1, feature point collation using an end point and a bifurcation of a fingerprint ridge is disclosed. Note that, the ridge is a linear ridge existing on a skin of a finger or a palm, or a strip-shaped pattern in a fingerprint or a palm print being applied by the linear ridge.

In addition to feature point data, a method of improving collation accuracy by performing collation using skeleton data generated in a feature extraction process has also been proposed (Patent Literature 1). The skeleton data are data being generated by thinning a ridge after binarization.

In addition, in operation of a fingerprint collation system in a police agency or the like, skeleton data and a feature point are automatically extracted and registered in a database for a high-quality imprinted fingerprint, but in many cases, an examiner manually inputs (or corrects) skeleton data or a feature point for a latent fingerprint being mostly a low-quality fingerprint image. Then, the skeleton data and the feature point of the fingerprint image registered in the database are treated as data on a searched side (file side) and the skeleton data and the feature point being input by an examiner are treated as data on a searching side (search side), respectively, and fingerprint collation (person identification) is performed based on a collation score between the pieces of the data.

CITATION LIST

Patent Literature

[Patent Literature 1] Japanese Patent No. 4030829
[Patent Literature 2] Japanese Patent No. 4030830
[Patent Literature 3] Japanese Patent No. 4586746
[Patent Literature 4] International Patent Publication No. WO2018/079630

Non Patent Literature

[Non Patent Literature 1] D. Maltoni, "Handbook of Fingerprint Recognition", Springer, 2009
[Non Patent Literature 2] ANSI/NIST-ITL 1-2000 Revision of ANSI/NIST-CSL1-1993 & ANSI/NIST-ITL 1a-1997, "NIST Special Publication 500-245", [online], Jul. 27, 2000, [Searched on Mar. 16, 2020], Internet URL<https://www.nist.gov/sites/default/files/documents/itl/ansi/sp500-245-a16.pdf>

SUMMARY OF INVENTION

Technical Problem

For example, in high-quality fingerprint images such as imprinted fingerprints, since a sufficient number of feature points can be extracted from both fingerprint images, high collation accuracy can be ensured. However, in a case where one of the fingerprints is a latent fingerprint of a small area, an area in which a feature point can be extracted is narrow, and a sufficient number of feature points cannot be extracted. As a result, there is an inconvenience that it is difficult to collate with high accuracy.

In addition, even when an examiner confirms and inputs an "opposite feature point pair" for a latent fingerprint, in a case where the opposite feature point pair is not extracted from an imprinted fingerprint being a pair to the latent fingerprint, the feature point of the latent fingerprint becomes an unpaired feature point, which causes deterioration of a collation score.

An object of the present disclosure is to provide a stripe pattern image collating device, a stripe pattern image collating method, and a computer-readable medium storing a program thereof that improve collation accuracy.

Solution to Problem

One aspect of a stripe pattern image collating device according to the present disclosure includes: a feature extracting unit configured to extract a feature point and a skeleton from a first stripe pattern image and a second stripe pattern image in which a stripe pattern is formed of ridges, and generate feature point data and skeleton data; a skeleton collating unit configured to collate two sets of pieces of the feature point data and pieces of the skeleton data that are extracted from each of the first stripe pattern image and the second stripe pattern image, and calculate a collation score; and an image analyzing unit configured to analyze the second stripe pattern image with respect to an area in which an opposite feature point pair of the first stripe pattern image exists, calculate an image analysis score, and correct the collation score.

One aspect of a stripe pattern image collating method according to the present disclosure includes: extracting a feature point and a skeleton from a first stripe pattern image and a second stripe pattern image in which a stripe pattern is formed of ridges, and generating feature point data and skeleton data; collating two sets of pieces of the feature point data and pieces of the skeleton data that are extracted from each of the first stripe pattern image and the second stripe pattern image, and calculating a collation score; and analyzing the second stripe pattern image with respect to an area in which an opposite feature point pair of the first stripe pattern image exists, calculating an image analysis score, and correcting the collation score.

One aspect of a computer-readable medium storing a program according to the present disclosure causes a computer to execute processing of: extracting a feature point and a skeleton from a first stripe pattern image and a second stripe pattern image in which a stripe pattern is formed of ridges, and generating feature point data and skeleton data; collating two sets of pieces of the feature point data and pieces of the skeleton data that are extracted from each of the first stripe pattern image and the second stripe pattern image, and calculating a collation score; and analyzing the second stripe pattern image with respect to an area in which an opposite feature point pair of the first stripe pattern image exists, calculating an image analysis score, and correcting the collation score.

Advantageous Effects of Invention

According to the present disclosure, it is possible to improve collation accuracy by effectively utilizing a feature amount being an opposite feature point pair.

EXAMPLE EMBODIMENT

Figure 1:
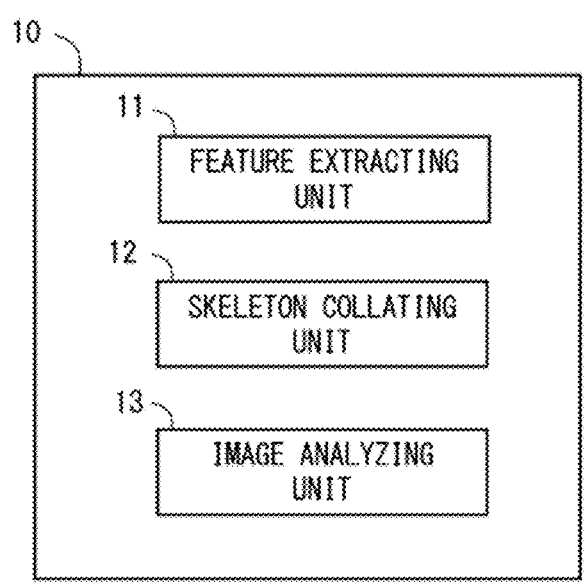
FIG. 1 is a block diagram illustrating one example of a configuration of a stripe pattern image collating device according to an example embodiment.

Example embodiments of the present invention will be described below with reference to the drawings. For clarity of explanation, the following description and drawings are appropriately omitted and simplified. Note that, in the drawings, a similar component is denoted by a similar reference sign, and description thereof is omitted as appropriate. In addition, a connection line between blocks in each figure includes both bidirectional and unidirectional. Note that, each content of the citation list described in the following example embodiments is incorporated as a part of the present specification.

The example embodiment relates to a technique for collating two stripe pattern images with each other, such as a fingerprint and a palm print. Note that, a stripe pattern image is an image including a curved stripe pattern formed of ridges. For example, a fingerprint image including a fingerprint area or a palm print image including a palm print area is equivalent to a stripe pattern image. However, the stripe pattern image is not limited to a fingerprint image or a palm print image as long as the stripe pattern image includes an end point or a bifurcation.

Before specifically describing the example embodiments, a problem to be solved by the present disclosure will be described in more detail. The following analysis was made by the inventors. Note that, in the drawings referred to in the following description, among feature points used for fingerprint collation, an end point of a fingerprint ridge is represented by a circle, and a bifurcation is represented by a square. In addition, a short line extending from each of the end point and the bifurcation represents a direction of the feature point.

Figure 29:
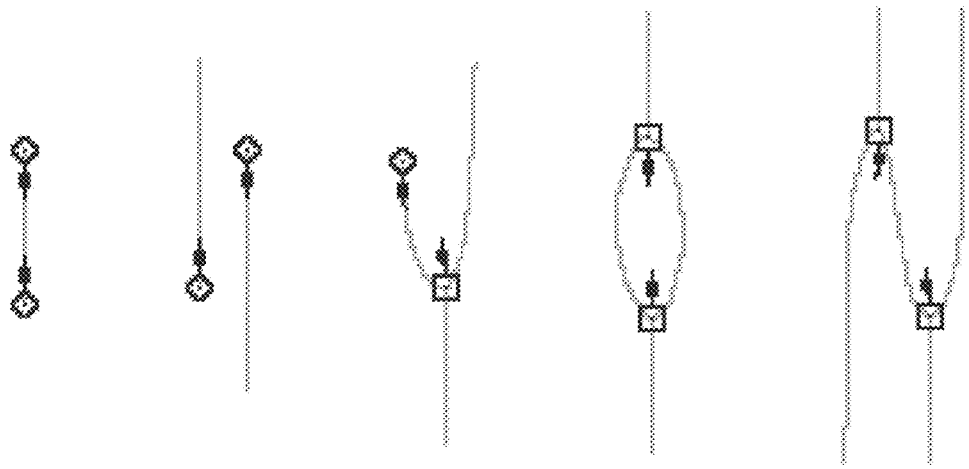
FIG. 29 is a diagram illustrating an opposite feature point pair.
Figure 29:
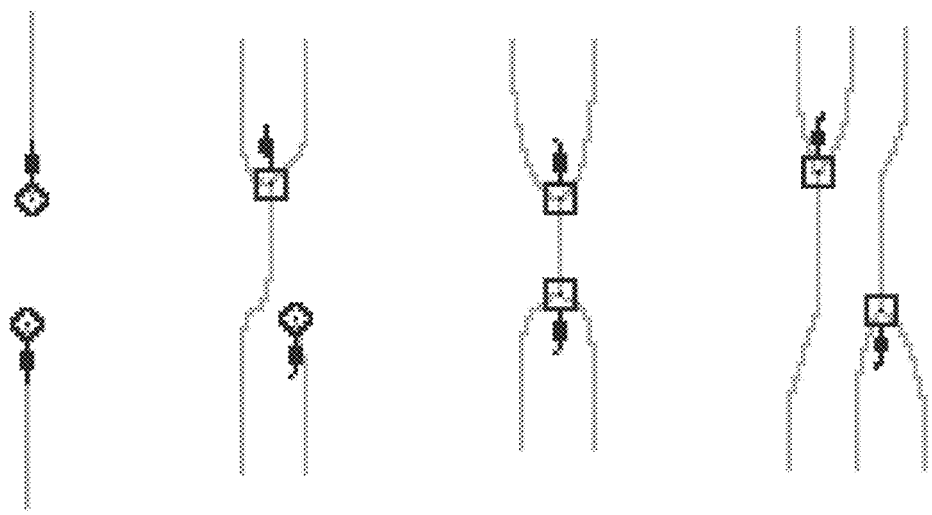

As described above, there is a case where an examiner confirms and inputs "opposite feature point pair" for a latent fingerprint. Herein, as illustrated in FIG. 29, the opposite feature point pair refers to two feature points existing in the vicinity with the feature point directions being opposite (facing) to each other. In upper five examples in FIG. 29, feature points are directed outward from each other (outgoing pair). On the other hand, in lower four examples in FIG. 29, feature points are directed inward to each other (oncoming pair).

When an examiner inputs an opposite feature point pair, in a case where the opposite feature point pair is not extracted from an imprinted fingerprint as a pair of the latent fingerprint, a feature point of the latent fingerprint becomes an unpaired feature point, in which causes deterioration of a collation score. Herein, a paired feature point and an unpaired feature point will be described. The paired feature point is that, when a feature point to be regarded as a pair with a feature point of one fingerprint image between the two fingerprint images to be collated exists in another fingerprint image, the feature point is referred to as the paired feature point. In some cases, the paired feature point is referred by combining the both feature points. On the other hand, the unpaired feature point is that, when a paired feature point does not exist in another fingerprint image among feature points of one fingerprint image, the feature point is referred to as the unpaired feature point.

Such an opposite feature point pair is easy to appear when image noise such as a wrinkle or blurring is erroneously extracted. Therefore, automatic feature extracting processing often remove as disclosed in "3.8.1 Structural post-processing" of Non-Patent Literature 1. As a result, even when an opposite feature point pair exists in a latent fingerprint, the fingerprint may become an unpaired fingerprint, which leads to deterioration of collation accuracy. Therefore, even when it is a true feature point, it may be recommended to perform operation in which an opposite feature point pair is not input. As a result, in a case of a latent fingerprint of a small area having a small number of feature points, although an opposite feature point pair becomes a relatively important feature amount, an opposite feature point cannot be used for collation.

In addition, since a surface of a finger or a palm is soft and easily deformed, even with the same finger or palm, a shape of fingerprint or palm print collected as an image usually differs from image to image. Therefore, even when two fingerprint images or palm print images to be collated are based on the same fingerprint or palm print, the images often do not overlap even when the images attempt to overlap a ridge by translation or rotation.

A method of, with respect to an opposite feature point pair that has become an unpaired feature point in a latent fingerprint, analyzing an imprinted fingerprint image on a file side, determining presence or absence of the opposite feature point pair, and adjusting a collation score is also conceivable. However, in a case of existing image distortion, it is difficult to limit a target area for analyzing presence or absence of an opposite feature point pair on an imprinted fingerprint side, which is considered to be difficult to achieve.

Therefore, the present inventors have devised the following stripe pattern image collating device.

FIG. 1 is a block diagram illustrating one example of a configuration of a stripe pattern image collating device 10 according to the example embodiment. Note that, a reference sign given to the following drawings is given to each component for convenience of understanding, and this description is not intended to be limiting in any way.

The stripe pattern image collating device 10 according to the example embodiment includes a feature extracting unit 11, a skeleton collating unit 12, and an image analyzing unit 13. The feature extracting unit 11 extracts a feature point and a skeleton from a first stripe pattern image and a second stripe pattern image in which a stripe pattern is formed of a ridge, and generates feature point data and skeleton data. The skeleton collating unit 12 collates two sets of a piece of feature point data and a piece of skeleton data being extracted from each of the first stripe pattern image and the second stripe pattern image, and calculates a collation score. The image analyzing unit 13 analyzes the second stripe pattern image with respect to an area in which an opposite feature point pair of the first stripe pattern image exists, calculates an image analysis score, and corrects the collation score. Thus, it becomes possible to improve collation accuracy by effectively utilizing a feature amount being the opposite feature point pair.

Hereinafter, a specific example embodiment will be described in more detail with reference to FIG. 2. Herein, an example in which the stripe pattern image collating device 10 is applied to a fingerprint collating device will be described. The fingerprint collating device illustrated in FIG. 2 includes the stripe pattern image collating device 10, a display device 20, and an input device 30.

The stripe pattern image collating device 10 includes a feature extracting unit 11, a skeleton collating unit 12, an image analyzing unit 13, and a feature correcting unit 14. The feature extracting unit 11 extracts at least a skeleton and a feature point from each of two stripe pattern images. In other words, the feature extracting unit 11 extracts a feature amount (e.g., a skeleton and a feature point) characterizing an image from the image input to the stripe pattern image collating device 10.

A skeleton and a feature point may be automatically extracted by a computer or the like from a stripe pattern image by any existing method, or may be selected by an examiner or the like. A method of calculating an associating relationship of a feature point and a skeleton included in two stripe pattern images is disclosed in Patent Literature 2.

Figure 2:
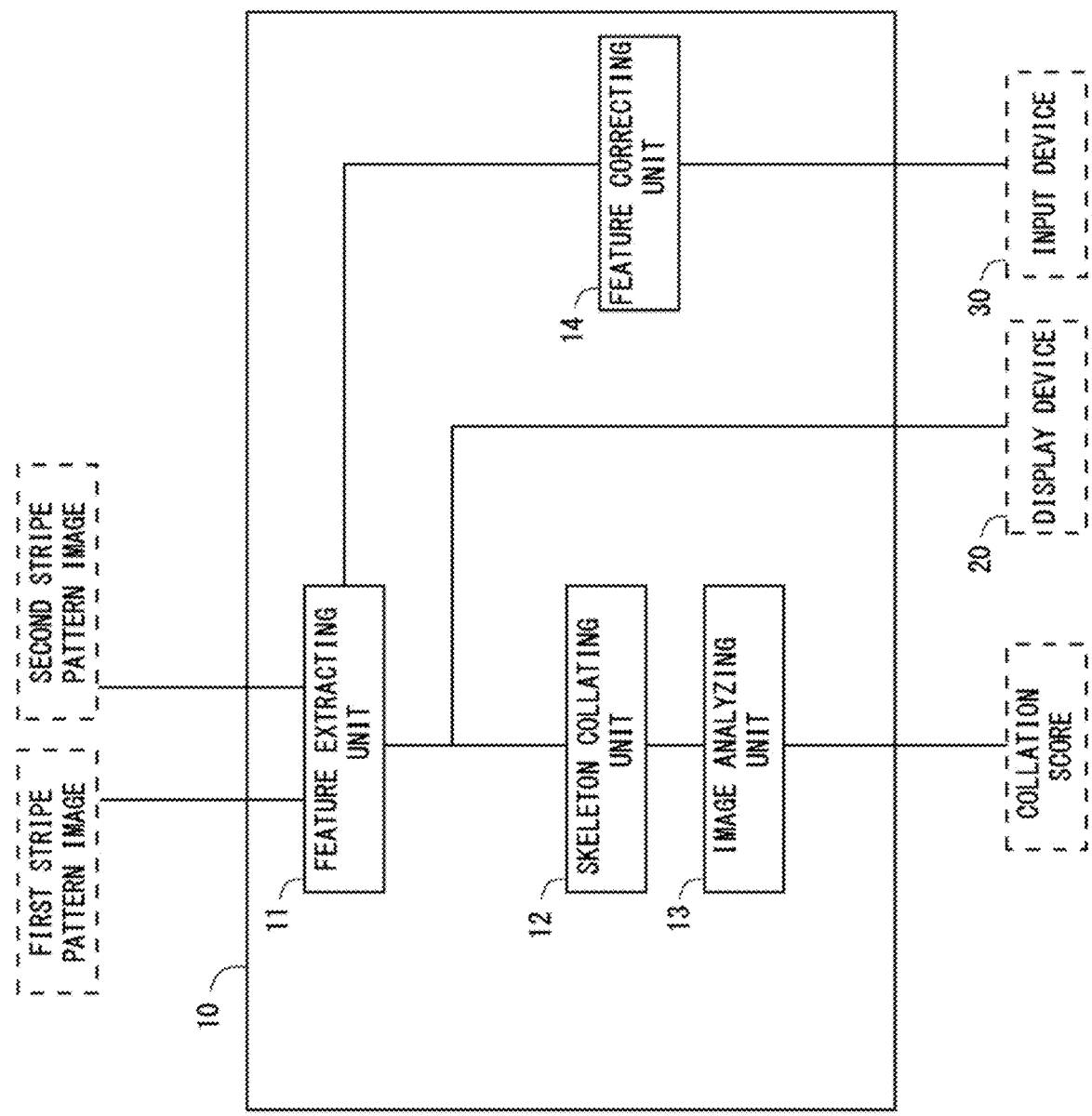
FIG. 2 is a block diagram illustrating one example of a configuration of the stripe pattern image collating device according to the example embodiment.

For example, the feature extracting unit 11 extracts a skeleton and a feature point from each of the first stripe pattern image and the second stripe pattern image, as illustrated in FIG. 2. Note that, the feature extracting unit 11 can also extract ridge direction data and ridge area (zone) data in a process of extracting a feature point.

In addition, as will be described later, in a case where an examiner corrects and inputs a skeleton or a feature point manually (for example, in a case where a skeleton or a feature point is deleted or added), the feature extracting unit 11 updates the skeleton or the feature point after holding the manually corrected skeleton or feature point. In other words, the feature extracting unit 11 also holds a feature of the stripe pattern image corrected by an examiner, and re-extracts a skeleton and a feature point.

The skeleton collating unit 12 collates a feature point and a skeleton of each of two stripe pattern images with each other, and calculates an associating skeleton between the stripe pattern images. In other words, the skeleton collating unit 12 collates a feature point and a skeleton being extracted from each of the two stripe pattern images with each other, and outputs an associating feature point (paired feature point) and an associating skeleton (associating skeleton) together with a collation score. The skeleton collating unit 12 also recalculates a feature point pair and an associating skeleton, together with the collation score, from the two stripe pattern images by using the skeleton re-extracted by the feature extracting unit 11.

The image analyzing unit 13 analyzes another (imprinted fingerprint image) in a limited area where an opposite feature point pair of an unpaired feature point is supposed to exist in one stripe pattern image (latent fingerprint image), calculates an image analysis score, and corrects a collation score by using the calculated score.

The feature correcting unit 14 corrects the feature of at least one of the two stripe pattern images. Specifically, the feature correcting unit 14 performs, by an operation of an examiner, correction of the feature such as addition or deletion of a skeleton, addition or deletion of a feature point, and addition or deletion of a zone in each of two stripe pattern images independently.

The display device 20 is, for example, a liquid crystal display or the like, and displays a result of collation of two stripe pattern images or the like. In addition, the display device 20 may display the extracted skeleton, the extracted feature point, and the like in overlapping manner on the stripe pattern image. The input device 30 is, for example, a device for accepting an operation of an examiner (or a user), such as a keyboard or a mouse.

Figure 3:
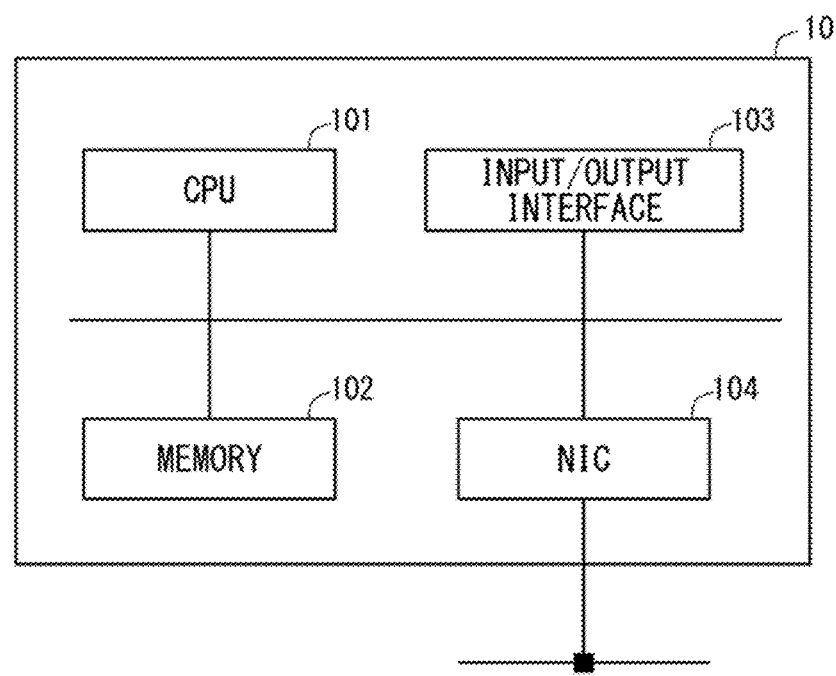
FIG. 3 is a block diagram illustrating one example of a hardware configuration for achieving the stripe pattern image collating device according to the example embodiment.

Next, a hardware configuration of the stripe pattern image collating device 10 according to the example embodiment will be described with reference to FIG. 3. FIG. 3 is a block diagram illustrating one example of a hardware configuration for achieving the stripe pattern image collating device 10 according to the example embodiment.

The stripe pattern image collating device 10 is achieved by a so-called information processing device (computer), and includes a configuration illustrated in FIG. 3. As illustrated in FIG. 3, the stripe pattern image collating device 10 includes, for example, a central processing unit (CPU) 101, a memory 102, an input/output interface 103, and a network interface card (NIC) 104 serving as a communication means, which are connected with one another by an internal bus.

However, the configuration illustrated in FIG. 3 is not intended to limit the hardware configuration of the stripe pattern image collating device 10. The stripe pattern image collating device 10 may include not-illustrated hardware, or may not include the NIC 104 or the like as necessary. In addition, the number of CPUs and the like included in the stripe pattern image collating device 10 is not intended to limit to the example illustrated in FIG. 3, and for example, a plurality of CPUs may be included in the stripe pattern image collating device 10.

The memory 102 is a random access memory (RAM), a read only memory (ROM), or an auxiliary storage device (hard disk or the like). The input/output interface 103 is a means as an interface for the display device 20 and the input device 30 illustrated in FIG. 2. In addition, the input device 30 may include an external storage device such as a universal serial bus (USB) memory.

A function of each component of the stripe pattern image collating device 10 described above is achieved, for example, by causing the CPU 101 to execute a program stored in the memory 102. In addition, the program can be updated by downloading via a network or using a storage medium in which the program is stored.

The hardware configuration of the stripe pattern image collating device 10 according to the example embodiment includes various variations, and is not limited to a specific configuration. For example, a device according to the present disclosure may be achieved by using software, or may be configured in such a way as to share various pieces of processing by using a plurality of pieces of hardware. Note that, these components may be configured by a single piece of circuitry (such as a processor), or may be configured by a combination of a plurality of pieces of circuitry. The circuitry referred to herein may be either dedicated or general-purpose. For example, a device according to the present disclosure may be achieved by a dedicated processor in one portion, and may be achieved by a general-purpose processor in another portion.

A program according to the present example embodiment may be any program as long as it causes a computer to execute processing described below. In the above examples, a program can be stored using various types of non-transitory computer-readable media, and supplied to a computer. The non-transitory computer-readable medium includes various types of tangible storage media. Examples of non-transitory computer-readable media include a magnetic recording medium (e.g., a flexible disk, a magnetic tape, a hard disk drive), a magneto-optical recording medium (e.g., a magneto-optical disk), a CD-read only memory (ROM), a CD-R, a CD-R/W, and a semiconductor memory (e.g., a mask ROM, a programmable ROM (PROM), an erasable PROM (EPROM), a flash ROM, a random access memory (RAM)). In addition, the program may also be supplied to a computer by various types of transitory computer-readable media. Examples of transitory computer-readable media include an electric signal, an optical signal, and an electromagnetic wave. The transitory computer-readable medium may supply a program to a computer via a wired communication path such as an electric wire and an optical fiber, or a wireless communication path.

Next, processing executed by the stripe pattern image collating device according to the example embodiment will be described with reference to flowcharts illustrated in FIGS. 4 and 5 and an example of a fingerprint image. Herein, a description will be given of a case where a latent fingerprint illustrated in FIG. 6 and an imprinted fingerprint illustrated in FIG. 7 (an imprinted fingerprint being a pair with the latent fingerprint in FIG. 6) are collated with each other by the stripe pattern image collating device 10 according to the example embodiment.

Figure 4:
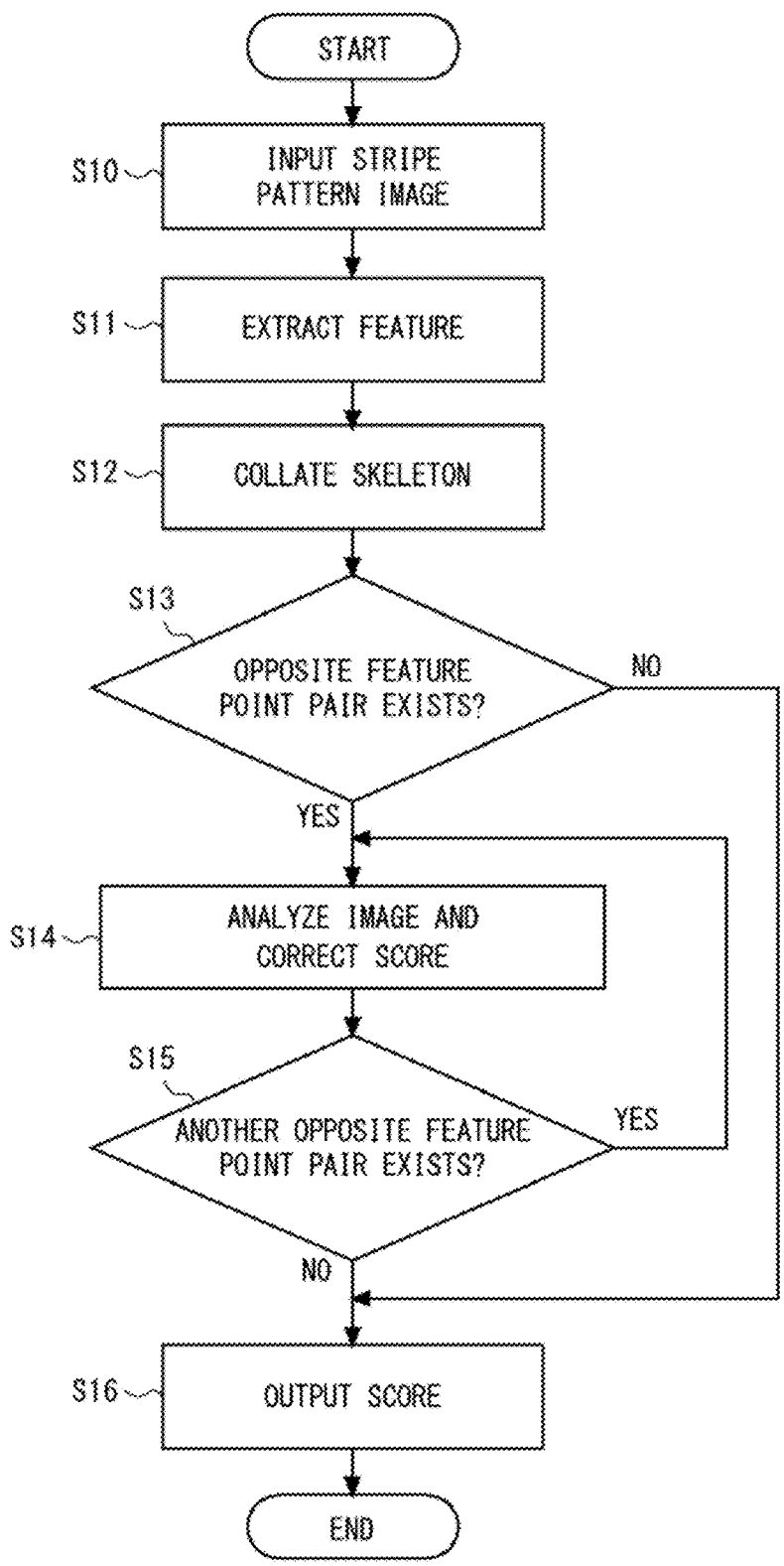
FIG. 4 is a flowchart illustrating one example of fingerprint collating processing executed by the stripe pattern image collating device according to the example embodiment.
Figure 5:
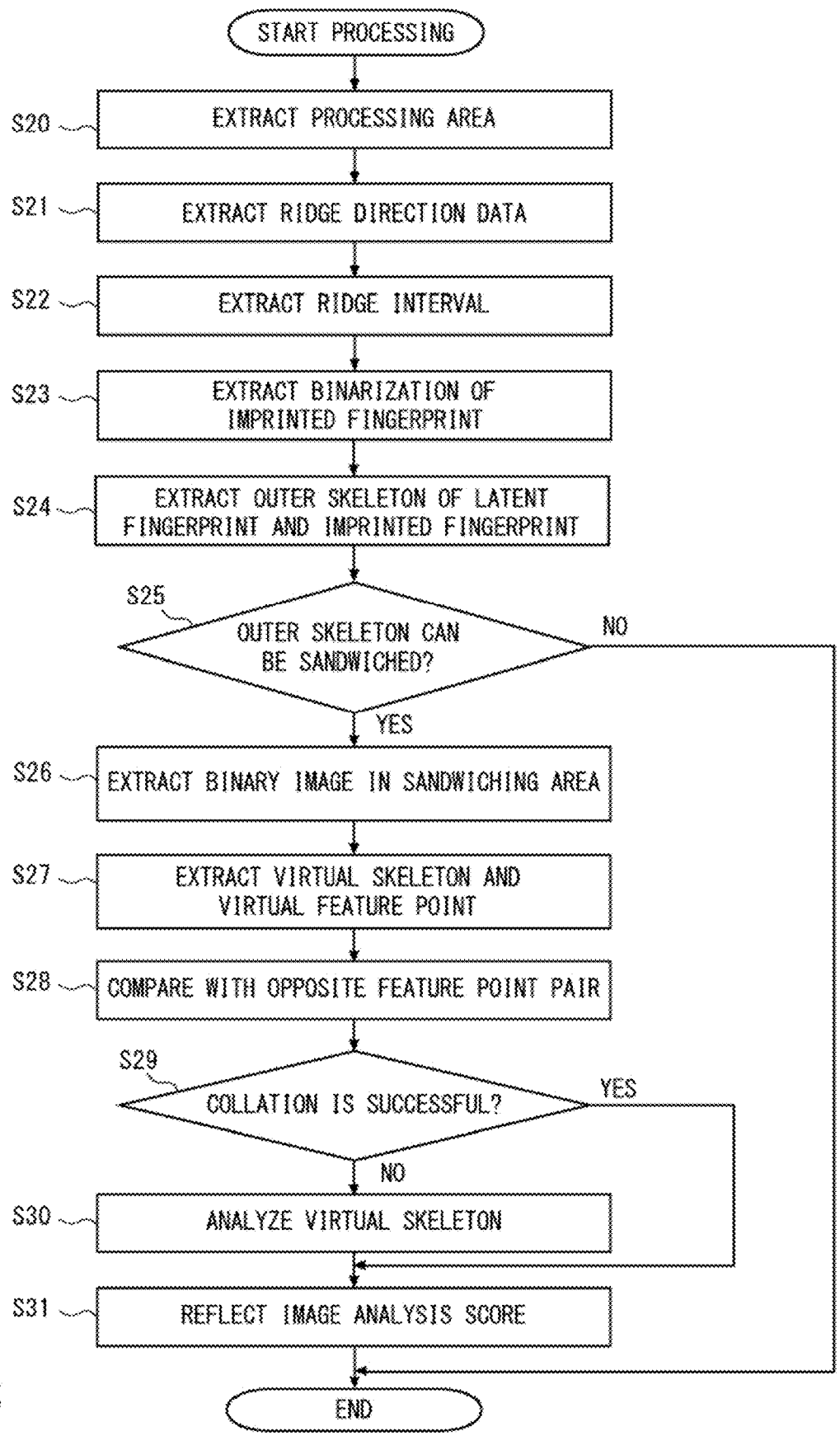
FIG. 5 is a flowchart illustrating one example of image analysis processing executed by the stripe pattern image collating device according to the example embodiment.

Referring to FIG. 4, first, two stripe pattern images are input to the feature extracting unit 11 of the stripe pattern image collating device 10 (step S10). Note that, the stripe pattern image input to the stripe pattern image collating device 10 may be acquired from an image input device such as a sensor or a scanner, or image data digitized and stored in advance may be acquired by a USB memory or the like.

Herein, an imprinted fingerprint is a fingerprint being collected for a purpose of registering in a database or the like, and has a feature that an area of a ridge area is wide and quality thereof is good. On the other hand, a latent fingerprint is a fingerprint that has been left in a crime scene or the like, and image distortion is often remarkable, or an area of a clear ridge area is often small.

Figure 6:
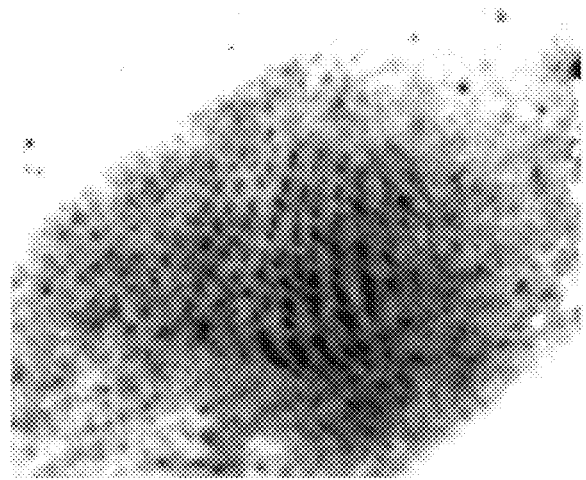
FIG. 6 is one example of a latent fingerprint image.
Figure 7:
FIG. 7 is one example of an imprinted fingerprint image.

Examples of fingerprint images illustrated in FIG. 6, FIG. 7, and the like are fingerprint images that have been digitized fingerprint images read by a sensor or a scanner. An example of such a fingerprint image is the image that has been digitized at a resolution of 500 dpi according to "ANSI/NIST-ITL 1-2000, Data Format for the Interchange of Fingerprint, Facial & Scar Mark & Tattoo (SMT) Information" standardized by a national institute of standards and technology (NIST) in the United States. Note that, the standardized document described above is disclosed in Non-Patent Literature 2.

Next, the feature extracting unit 11 extracts a feature (feature amount) of the fingerprint from the fingerprint images in FIG. 6 and FIG. 7 (step S11). Note that, the feature of the fingerprint includes a skeleton and a zone (ridge area) in addition to a feature point. Extraction of the feature point is usually performed by thinning (converting into a skeleton) a ridge included in the binarized fingerprint image, and extracting an end point and a bifurcation from the skeleton formed by thinning the ridge. For feature point extraction including converting into a skeleton, a feature extraction method disclosed in "3 Fingerprint Analysis and Representation" of Non-Patent Literature 1 can be used. Therefore, although a detailed description related to feature extraction is omitted, the feature extracting unit 11 generates a feature amount in the following general procedure.

The feature extracting unit 11 first extracts a direction of a ridge of a fingerprint image. Thereafter, the feature extracting unit 11 emphasizes a contrast of each ridge along an orthogonal direction of the ridge direction, and generates a binary image. Thereafter, the feature extracting unit 11 generates skeleton data by converting the binary image into a skeleton.

Note that, in a process of skeleton data generation processing, the feature extracting unit 11 generates "ridge direction data", and stores the generated data in the memory 102. More specifically, the feature extracting unit 11 calculates the ridge direction at each point on the ridge of the fingerprint image, and generates a set of the ridge directions as "ridge direction data". For example, when it is assumed that a point (a pixel on a ridge) for calculating ridge direction data of a fingerprint image is set as an origin of an XY coordinates system, and a finger tip of the fingerprint image is set as a Y-axis positive direction, the feature extracting unit 11 calculates an angle composed of an X-axis and a ridge as a ridge direction. Thereafter, the feature extracting unit 11 converts (approximates) the calculated angle into a direction (e.g., 16 divisions) acquired by dividing a quadrant of the XY coordinates system by a predetermined number, and generates a ridge direction at each point.

A set of the ridge directions of each point on the ridge of the fingerprint image becomes "ridge direction data". That is, in addition to generating the skeleton data, the feature extracting unit 11 generates ridge direction data including information related to the ridge direction at each point on the ridge forming the fingerprint image. Note that, the ridge direction data and utilization method thereof are described in Patent Literature 3, and the feature extracting unit 11 can use the method disclosed in the literature.

The feature extracting unit 11 extracts a feature point from the skeleton data. More specifically, the feature extracting unit 11 extracts a feature point by extracting an end point and a bifurcation of the skeleton from the skeleton data. Note that, a procedure at a time of extracting the feature point from the skeleton data can use the feature point extraction method disclosed in "3 Fingerprint Analysis and Representation" of Non-Patent Literature 1.

Figure 8:
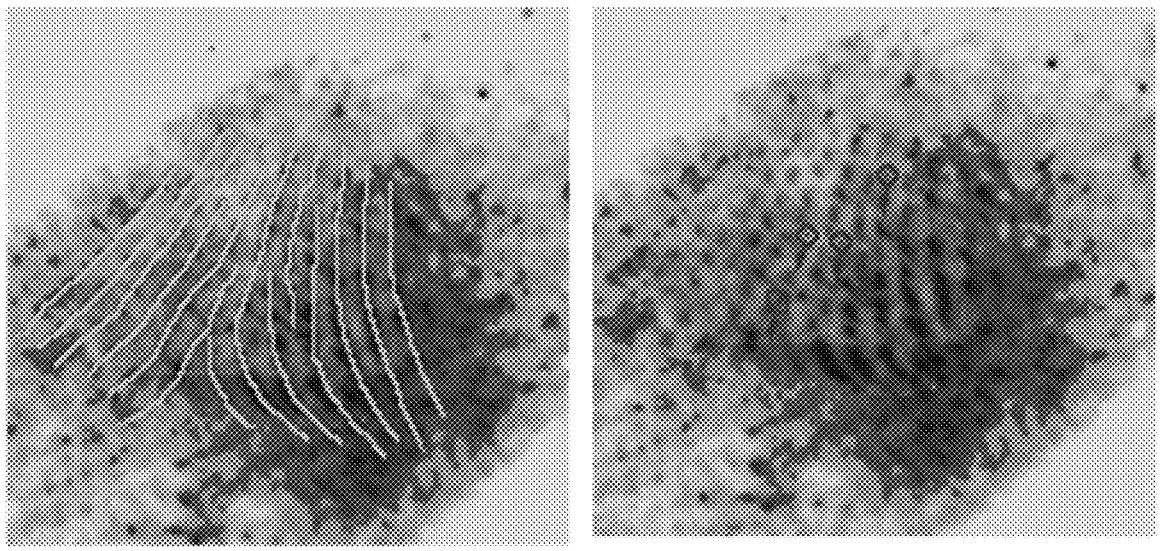
FIG. 8 is a diagram illustrating skeleton data (a left side) of the latent fingerprint image in FIG. 6, and feature points (a right side) extracted from the skeleton data.
Figure 9:
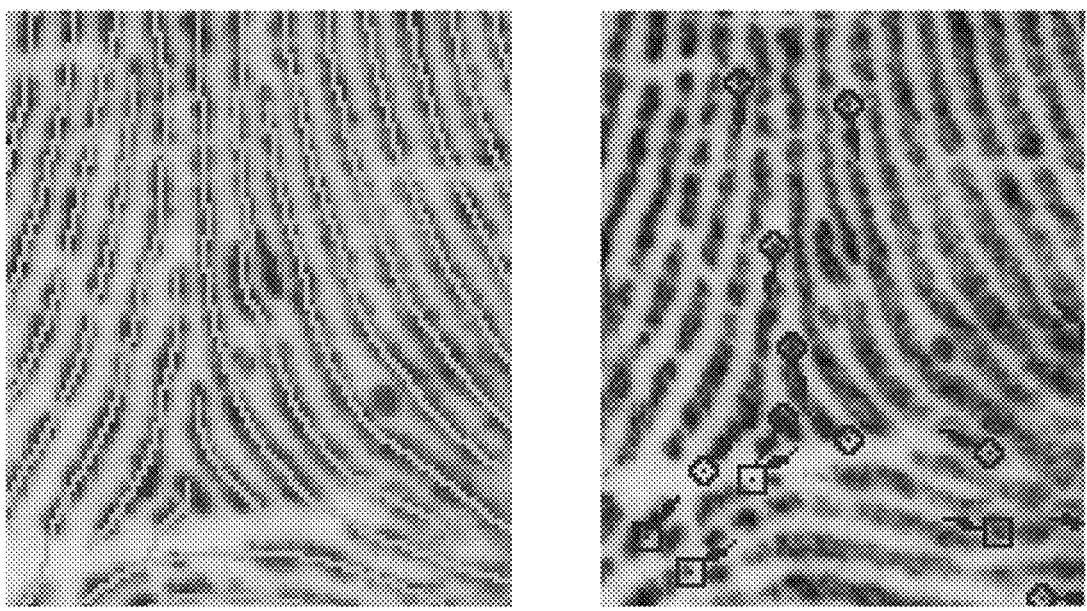
FIG. 9 is a diagram illustrating skeleton data (a left side) of the imprinted fingerprint image in FIG. 7, and feature points (a right side) extracted from the skeleton data.

In FIG. 8, a left side illustrates skeleton data of the latent fingerprint image in FIG. 6, and a right side illustrates feature points extracted from the skeleton data. In FIG. 9, a left side illustrates skeleton data of the imprinted fingerprint image in FIG. 7, and a right side illustrates feature points extracted from the skeleton data. The feature extracting unit 11 registers a position of each feature point, a type (end point, bifurcation) of the feature point, and a feature point direction in the memory 102.

Note that, as described above, in FIGS. 8 and 9, the end point is represented by a circle, and the bifurcation is represented by a square. In addition, the feature point direction is represented by a straight line having a bulge. In addition, in FIGS. 8 and 9, the skeleton, the feature point, and the zone are displayed superimposed on the fingerprint image.

Note that, regarding the zone, an area which cannot be recognized as a ridge is displayed in a filled state in such a way as to be distinguishable from other areas. In addition, the feature point is extracted from an area which can be recognized as a ridge. Further, an effective area of the skeleton collation by the skeleton collating unit 12 is an area in which the ridge areas overlap between the two fingerprint images. In the following description, the area is referred to as a common effective area.

Next, the skeleton collating unit 12 calculates an associating skeleton while performing skeleton collation, converts an image of the imprinted fingerprint side by using the information, and thereby generates an image converted to a relative coordinate position equivalent to that of the latent fingerprint side (step S12). Specifically, the skeleton collating unit 12 obtains an associating relationship of the skeletons by using the skeleton, the feature point, and the zone of the two stripe pattern images extracted by the feature extracting unit 11. The skeleton collating unit 12 calculates an associating skeleton by obtaining an associating relationship of the skeletons.

For example, the skeleton collation can be achieved by the method disclosed in Patent Literature 1. In addition, a method of calculating and displaying the associating skeleton can be achieved by a method disclosed as a ridge chart display function in Patent Literature 3. In addition, image conversion of the imprinted fingerprint side can be achieved by a method disclosed in Patent Literature 2.

Figure 10:
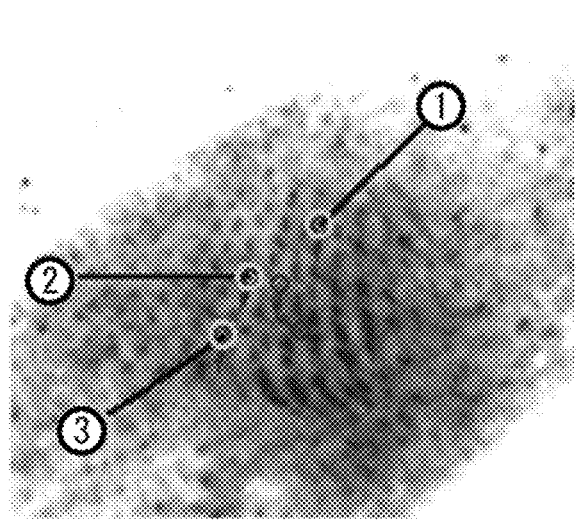
FIG. 10 is a diagram illustrating an associating relationship between a feature point of a latent fingerprint and a feature point of an imprinted fingerprint.
Figure 10:
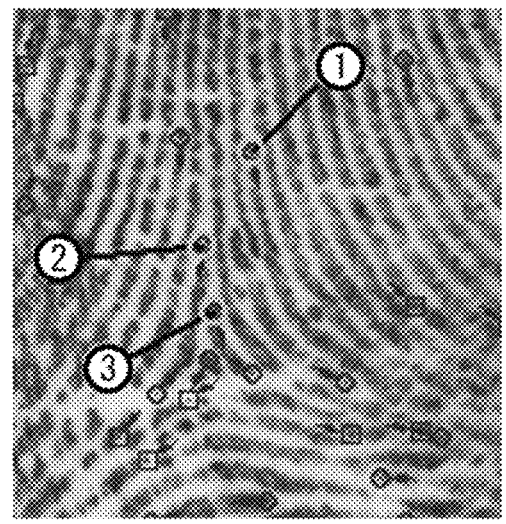

In the method disclosed in Patent Literature 1, feature point collation is first performed, and collating or non-collating of feature points is determined. FIG. 10 illustrates a collating relationship (associating relationship) of feature points using the feature point collation method described above. A left side in FIG. 10 is obtained by superimposing and displaying the feature points having the associating relationship with the latent fingerprint, and a right side is obtained by superimposing and displaying the feature points having the associating relationship with the imprinted fingerprint.

Normally, in the feature point collation, since a feature point type (end point, bifurcation) is not distinguished, it is determined that the two fingerprints are equivalent to each other even having the different feature point types. Referring to FIG. 10, it can be seen that, among five feature points extracted in the latent fingerprint, three feature points (the feature points labeled 1 to 3 in FIG. 10) have an associating relationship with the feature points of the imprinted fingerprint.

Figure 11:
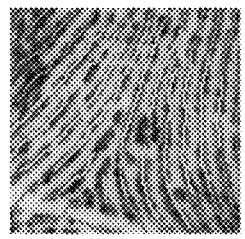
FIG. 11 is a ridge chart illustrating an associating relationship between a skeleton of a latent fingerprint and a skeleton of an imprinted fingerprint.
Figure 11:

In addition, when the method disclosed in Patent Literature 3 is used, the skeleton collating unit 12 can superimpose and display associating skeletons (ridge charts) on two stripe pattern images. FIG. 11 is a ridge chart diagram (result of skeleton collation) illustrating an associating relationship between the skeletons of the latent fingerprint and the imprinted fingerprint by collating the skeletons. A left side in FIG. 11 is obtained by superimposing an associating skeleton on the latent fingerprint, and a right side is obtained by superimposing an associating skeleton on the imprinted fingerprint.

In FIG. 11, the ridge chart is superimposed on the fingerprint image. For example, in a case where FIG. 11 is displayed on the display device 20, the skeleton (associating skeleton) determined to associate with each other and the skeleton (non-associating skeleton) determined not to associate with each other in the common effective area can be displayed in different colors. In addition, since a skeleton outside the common effective area is a skeleton outside a target at a time of calculation of a collation score, for example, the skeleton can be displayed in a lighter color in such a way as not to be conspicuous.

Figure 12:
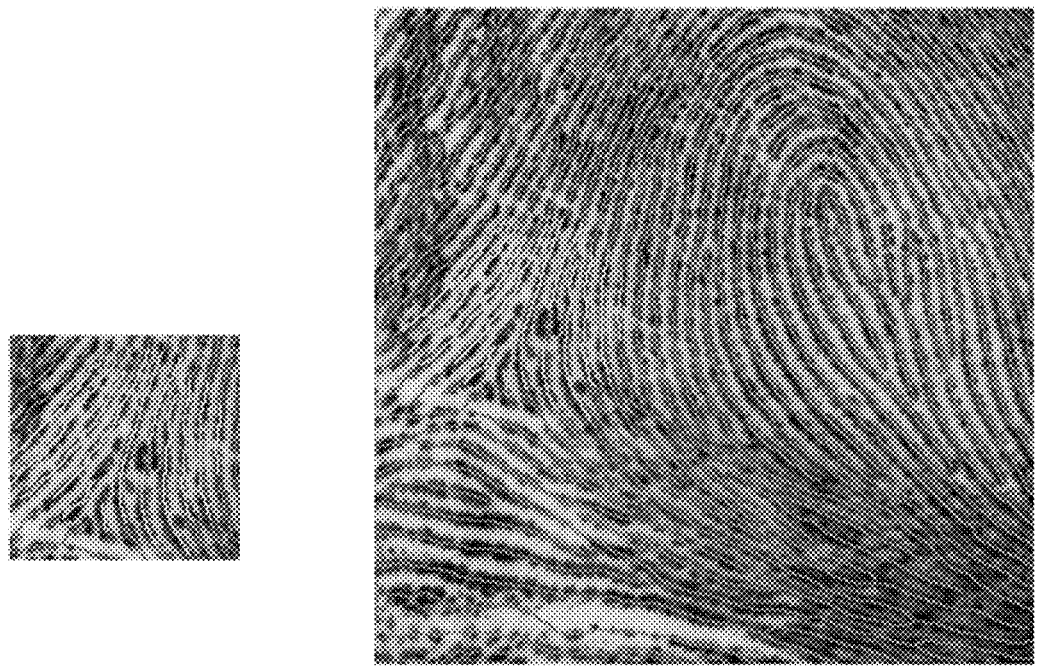
FIG. 12 is a result of non-linear conversion of an imprinted fingerprint image.

In addition, by using the method disclosed in Patent Literature 2, it is possible to generate an image converted into a relative coordinate position equivalent to that of the latent fingerprint side by converting an image on the imprinted fingerprint side into a non-linear image, by using the associating relationship of the coordinates of each pixel on the associating skeleton as reference information. That is, distortion correction of the imprinted fingerprint image can be performed by using the associating skeleton data of a result of skeleton collation. A right side in FIG. 12 illustrates s result of non-linear conversion of the imprinted fingerprint image in this manner. A left side of FIG. 12 is a latent fingerprint image. As illustrated in FIG. 12, it can be seen that the relative position of each pixel of the imprinted fingerprint has been converted into an equivalent level to that of the latent fingerprint image.

Figure 13:
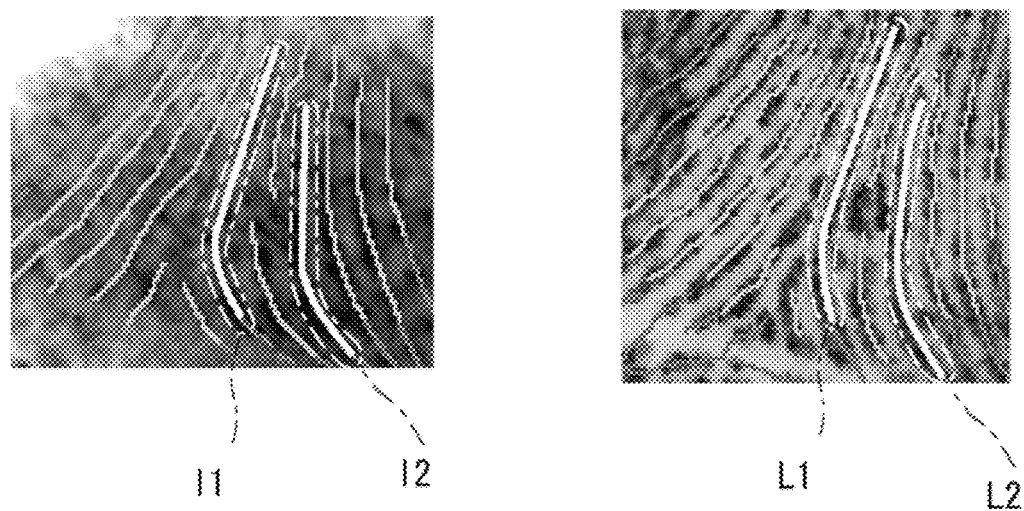
FIG. 13 is a diagram illustrating a result of skeleton collation.

In FIG. 13, in order to explain the associating relationship of the skeletons, the two sets of associating skeletons in FIG. 12 are represented by different signs (11 and 12 in a left side latent fingerprint image, and L1 and L2 in a right side imprinted fingerprint image).

Next, the image analyzing unit 13 analyzes paired feature point data output from the skeleton collating unit 12, and checks whether an opposite feature point pair exists in a group of unpaired feature points (not being paired feature points) on the common effective area with respect to a latent fingerprint feature point (step S13). When there is no opposite feature point pair (No in step S13), the processing proceeds to step S16, the collation score output from the skeleton collating unit 12 is output, and the processing ends.

When there is an opposite feature point pair (Yes in step S13), the processing proceeds to step S14. In step S14, the image analyzing unit 13 analyzes the non-linear converted image of the imprinted fingerprint with respect to the opposite feature point pair of the extracted latent fingerprint, checks whether a feature point associated with the opposite feature point pair on the latent fingerprint side is extracted, and corrects the collation score based on the result (step S14). Note that, a processed mark can be attached to the opposite feature point pair that have been analyzed.

Next, the image analyzing unit 13 analyzes the paired feature point data output from the skeleton collating unit 12, and checks whether an unprocessed opposite feature point pair exists in the group of unpaired feature points (not being paired feature points) on the common effective area of the latent fingerprint feature point (step S15). When the opposite feature point pair remains (Yes in step S15), the processing returns to step S14, and the collation score is corrected again. When no opposite feature point pair remains (No in step S15), the processing proceeds to step S16, the latest corrected collation score output from the image analyzing unit 13 is output, and the processing ends.

Herein, the processing of the image analyzing unit 13 will be described in detail with reference to the flowchart in FIG. 5. The image analyzing unit 13 checks whether an opposite feature point pair exists in the group of unpaired feature points on the common effective area with respect to the latent fingerprint feature point. Referring to the latent fingerprint image on the left side of FIG. 10, the feature points labeled 1 to 3 refer to paired feature points, and the feature points not labeled refer to unpaired feature points. The two unpaired feature points illustrated in the image on the left side of FIG. 10 becomes an opposite feature point pair. Description will be continued taking this opposite feature point pair as an example.

Figure 14A:
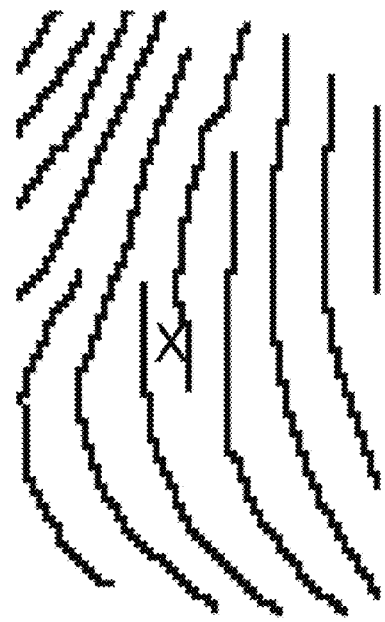
FIG. 14A is a diagram illustrating midpoint coordinates of coordinates of two unpaired feature points (opposite feature point pair) extracted from the skeleton data on the left side in FIG. 10.

FIG. 14A is a diagram illustrating a midpoint coordinate of a coordinates of the opposite feature point pair. This coordinate is indicated by an X mark in FIG. 14A. A rectangle having a long side of about 60 pixels and a short side of about 30 pixels along the ridge direction on the midpoint coordinates is determined as a processing area (step S20).

Figure 14B:
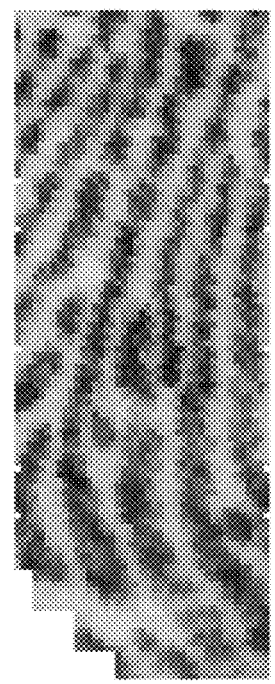
FIG. 14B is an imprinted fingerprint image being cut out in a range of a processing area.

Note that, since an average ridge interval of a fingerprint is about 10 pixels, the long side has a size of 6 ridges and the short side has a size of 3 ridges. The processing area may be the entire image, but it is preferable to limit the processing area in order to shorten a processing time. The processing area is applied to both the latent fingerprint side and the imprinted fingerprint side. An imprinted fingerprint image being cut out in a range of the processing area determined in this manner is illustrated in FIG. 14B.

Figure 14C:
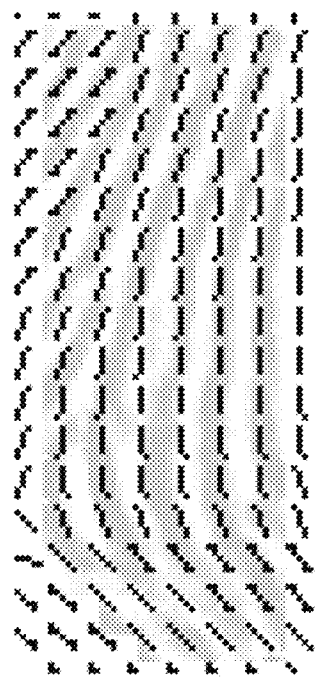
FIG. 14C is a diagram illustrating ridge direction data being displayed in overlapping manner on a fingerprint image.

Next, the image analyzing unit 13 extracts ridge direction data of the latent fingerprint and the imprinted fingerprint (step S21). The ridge direction of the latent fingerprint can be extracted from the skeleton data. In this method, a tangential direction with respect to each pixel of the skeleton pixels can be set as a ridge direction of the pixel. The ridge direction data extracted in the latent fingerprint can also be applied to the imprinted fingerprint side subjected to non-linear conversion. The ridge direction data extracted in this manner is illustrated in FIG. 14C. In FIG. 14C, the ridge direction data is displayed in overlapping manner on the fingerprint image.

Next, the image analyzing unit 13 extracts ridge interval data from the skeleton data of the latent fingerprint (step S22). In extraction of the ridge interval from the skeleton data, for each pixel of the non-skeleton pixel, a straight line is extended in two directions in a direction orthogonal to the ridge direction, and a distance between two intersections with a first hitting skeleton can be set as the ridge interval. In the pixel on the skeleton, since the ridge interval is not extracted, it can be set to the same value as that of a value of the ridge interval of an adjacent pixel. After that, removing an extreme value and smoothing processing with neighboring pixels is performed.

Figure 14D:
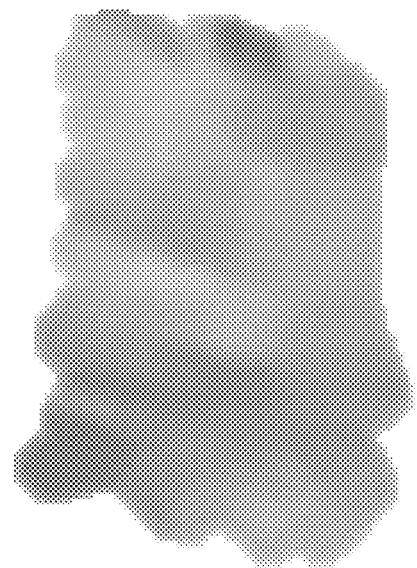
FIG. 14D is a diagram illustrating ridge interval data extracted from the skeleton data in FIG. 14A.

FIG. 14D represents ridge interval data extracted from the skeleton data in FIG. 14A. In FIG. 14D, the wider the ridge interval, the higher density (darker) is displayed. The skeleton of the latent fingerprint is usually accurate because an examiner manually corrects and inputs, and the ridge interval data based on the data is also conceivable to be highly accurate. The ridge interval data extracted in the latent fingerprint can also be applied to the imprinted fingerprint side subjected to non-linear conversion.

Next, the image analyzing unit 13 extracts a binary image from the imprinted fingerprint image subjected to the non-linear conversion (step S23). A method of extracting a binary image from a fingerprint image is described in "3 Fingerprint Analysis and Representation" of Non-Patent Literature 1.

Figure 15A:
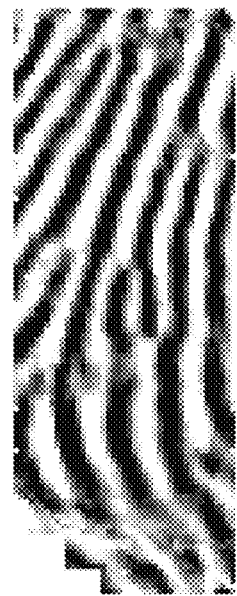
FIG. 15A is a fingerprint image in which a contrast of a ridge is emphasized.
Figure 15B:
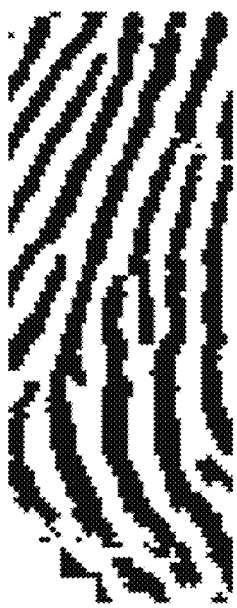
FIG. 15B is a binarized image of FIG. 15A.

In this process, a contrast of the ridge is emphasized by using the ridge direction data and the ridge interval data by a method described in "3.6.2 Contextual Filtering" of Non-Patent Literature 1. Herein, by using accurate ridge direction data and ridge interval data, a high-quality ridge emphasized image can be generated. FIG. 15A is a fingerprint image in which the contrast of the ridge is emphasized in this manner, and FIG. 15B is a binarized image thereof.

Next, the image analyzing unit 13 determines an outer skeleton existing outside an opposite feature point pair from the skeleton of the latent fingerprint (step S24). The outer skeleton is a skeleton formed by extending a straight line from the midpoint of the opposite feature point pair in two directions in a direction orthogonal to the ridge direction, and being a first hitting. When the skeleton is connected to any of the opposite feature point pairs, it is further set as the outer skeleton.

Figure 16:
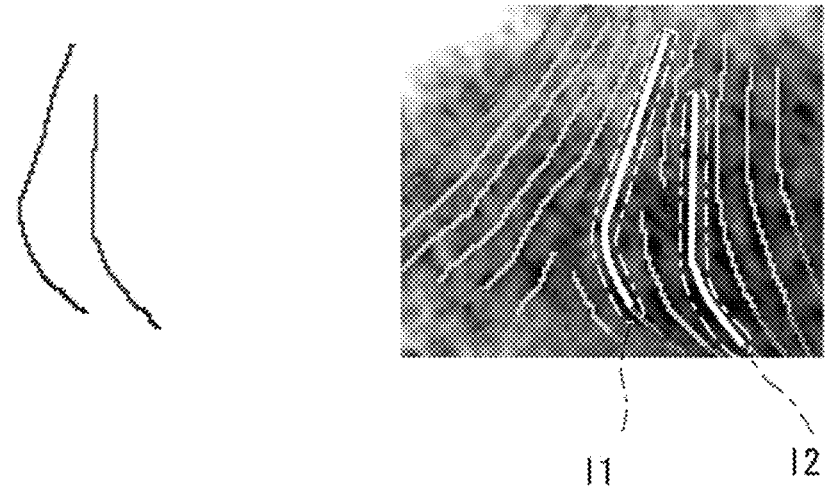
FIG. 16 is a diagram illustrating two outer skeletons of a latent fingerprint.

The two outer skeletons of the latent fingerprint determined in this manner are illustrated on a left side in FIG. 16. Next, it is checked whether the two outer skeletons are associating skeletons. For a purpose of explanation, on a right side in FIG. 16, the same diagram as on the left side in FIG. 13 is illustrated. It can be seen from FIG. 16 that the two outer skeletons are associating skeletons illustrated by 11 and 12. When any of the two outer skeletons is not the associating skeleton, processing for the opposite feature point pair is interrupted, and the processing proceeds to next processing.

Figure 17:
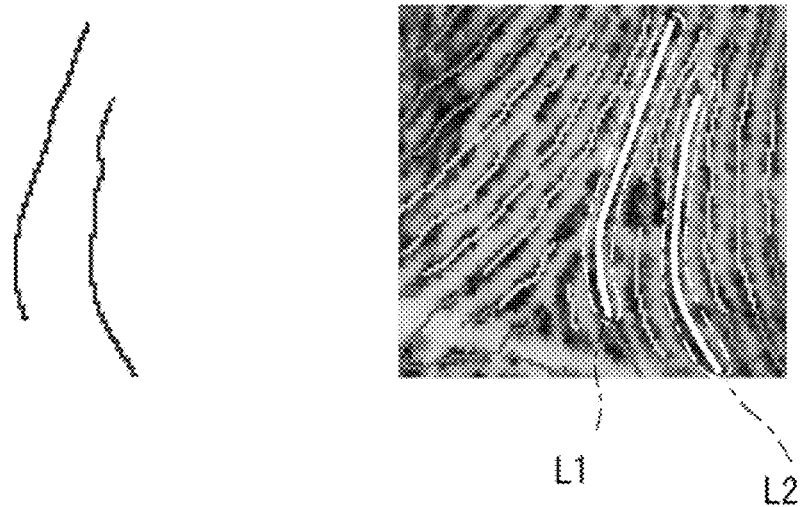
FIG. 17 is a diagram illustrating two outer skeletons of an imprinted fingerprint.

Once the outer skeleton of the latent fingerprint is determined, the outer skeleton of the imprinted fingerprint is also determined at the same time. On a left side in FIG. 17, an outer skeleton of the imprinted fingerprint is illustrated. On a right side in FIG. 17, the same diagram as on the right side in FIG. 13 is illustrated. As illustrated in FIG. 17, the two outer skeletons are also associating skeletons illustrated by L1 and L2.

Next, the image analyzing unit 13 determines whether the outer skeleton of the latent fingerprint is a sandwiching skeleton (step S25). For example, when the two outer skeletons extend more than about 10 pixels (one ridge) outward in the ridge direction of the two feature points of the opposite feature point pair, the outer skeleton is determined as a sandwiching skeleton. Referring to FIG. 16, it can be seen that the outer skeleton is a sandwiching skeleton because the outer skeleton includes an opposite feature point pair and extends in the ridge direction (substantially perpendicular) to a length equal to or more than one ridge.

Figure 18:
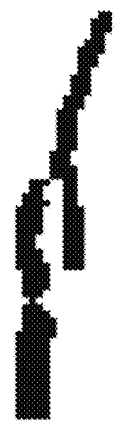
FIG. 18 is a binary image in a sandwiching area of a imprinted image.

Next, the image analyzing unit 13 limits the binarized image extracted in step S23 to inside of a sandwiching area, and thereby extracts a binarized image in the sandwiching area (step S26). In this process, a black pixel of the binarized image forming the outer skeleton is removed (converted into a white pixel). Specifically, the black pixels connected to each of the outer skeleton pixels are converted into white pixels up to a distance of about 5 pixels. FIG. 18 is a binary image in the sandwiching area of the imprinted image extracted in this manner.

Figure 19:
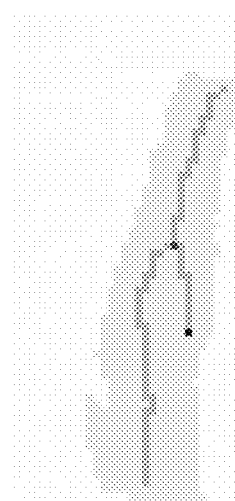
FIG. 19 is a diagram illustrating a skeleton and a feature point in a sandwiching area.

Next, the image analyzing unit 13 extracts a skeleton and a feature point from the binarized image extracted in step S26 (step S27). This method is described in "3 Fingerprint Analysis and Representation" of Non-Patent Literature 1. FIG. 19 illustrates the skeletons and the feature points in the sandwiching area extracted in this manner. Herein, the feature points are illustrated by dark dots. The skeleton and the feature point are referred to as a virtual skeleton and a virtual feature point, respectively.

Figure 20:
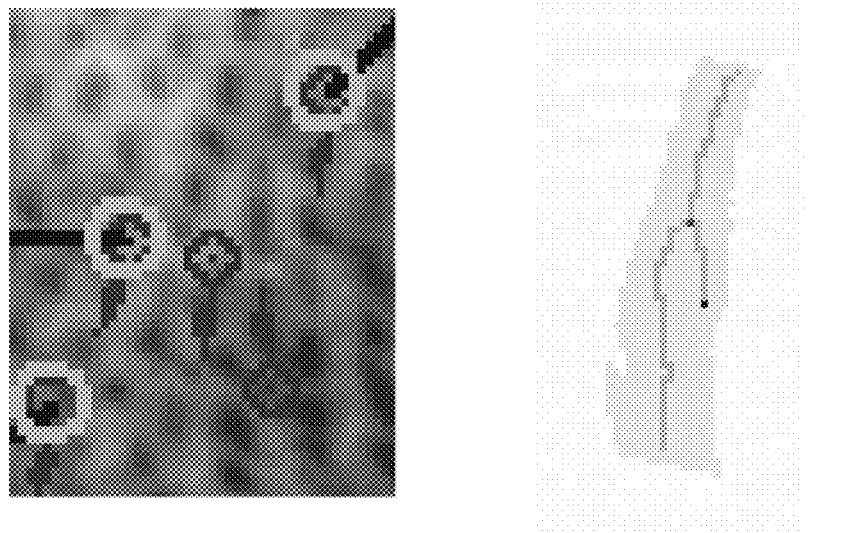
FIG. 20 is a diagram illustrating an opposite feature point pair and a virtual feature point arranged side by side.

Next, the image analyzing unit 13 compares and collates the opposite feature point pair with the virtual feature point extracted in step S27 (step S28). FIG. 20 illustrates the opposite feature point pairs (an enlarged diagram of the left side in FIG. 10) and the virtual feature points (FIG. 19) extracted in step S27 arranged side by side. When the two diagrams are compared, the virtual feature points exist at similar positions with respect to the two feature points of the opposite feature point pair, therefore the virtual feature points are regarded as paired feature points (collation success).

When the two feature points of the opposite feature point pair have a pair relationship with the virtual feature point, an image analysis score having a positive value (plus) is calculated. When the image analysis score having the positive value is calculated, it is determined that the collation is successful (Yes in step S29), and the processing proceeds to step S31.

In step S29, when it is not determined that the collation is successful, the processing proceeds to step S30, and the image analyzing unit 13 analyzes the virtual skeleton and calculates an image analysis score. This description will be described later using another sample.

Next, the image analyzing unit 13 reflects the image analysis score for the opposite feature point pair in the collation score, and ends the processing (step S31). Reflection of the image analysis score to the collation score may be performed by a simply addition method.

Figure 21:
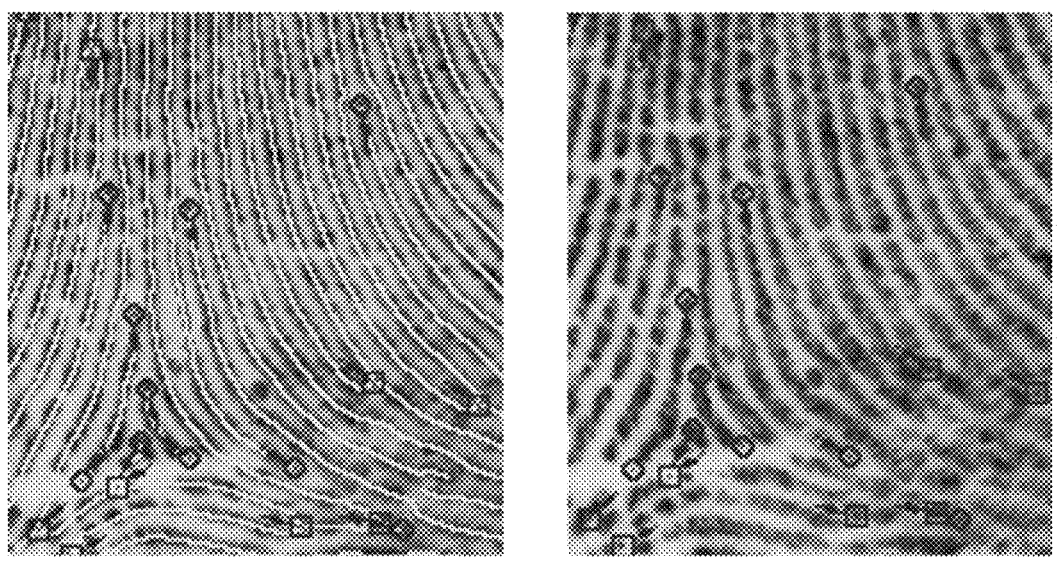
FIG. 21 is a diagram in which a ridge associated with an opposite feature point pair is deleted from the imprinted fingerprint image in FIG. 7.

Next, image analysis processing for an unpaired fingerprint will be described with reference to a second imprinted fingerprint sample illustrated in FIG. 21. A left side diagram in FIG. 21 is acquired by deleting a ridge associated with the opposite feature point pair from the imprinted fingerprint image in FIG. 7, and is an imprinted fingerprint to be viewed as a non-paired fingerprint. Note that, a right side in FIG. 21 is a diagram (same as the right side in FIG. 9) in which feature points extracted from the skeleton data are displayed in overlapping manner on the imprinted image.

Figure 22:
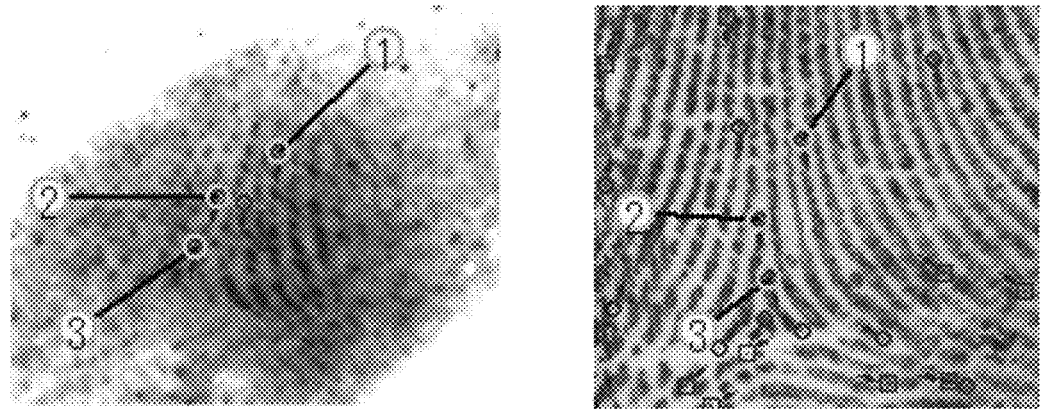
FIG. 22 is a diagram illustrating an associating relationship between a feature point of a latent fingerprint and a feature point of an imprinted fingerprint.

It can be seen that paired feature points in FIG. 22 are same as the result (FIG. 10) for the paired fingerprints. In addition, since there is no imprinted fingerprint ridge associated with the opposite feature point pair, it is understood that the collation score should be reduced. In the processing performed by the image analyzing unit 13, steps S20 to S27 are same as the processing for the example of the paired fingerprint pair described above, and therefore description thereof is omitted.

Figure 23:
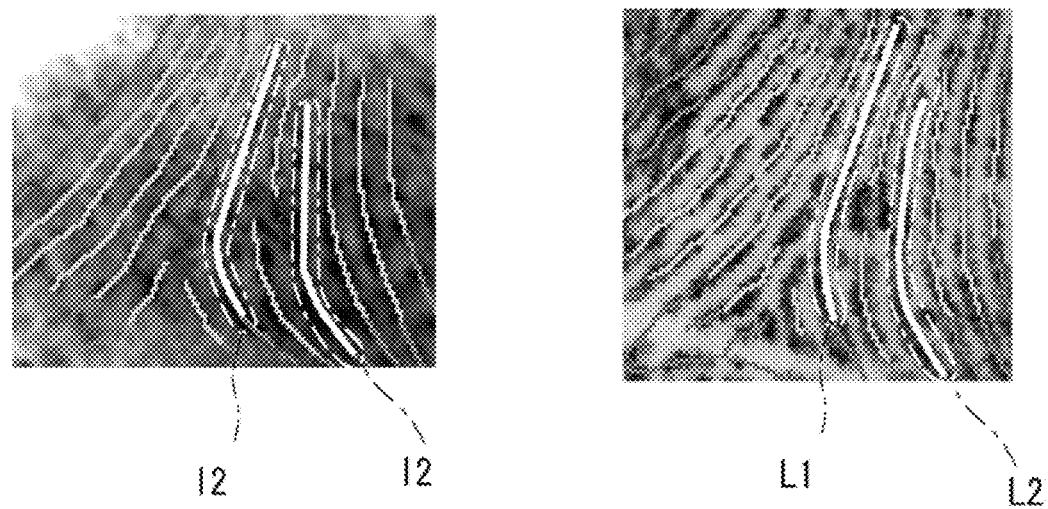
FIG. 23 is a diagram illustrating a result of skeleton collation.
Figure 24A:
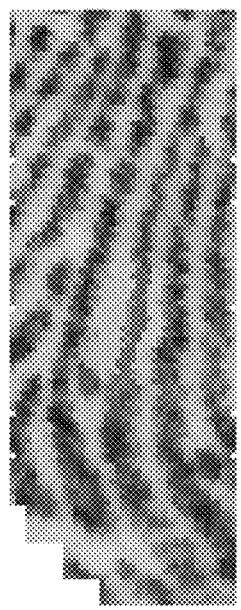
FIG. 24A is an imprinted fingerprint image being cut out in a range of a processing area.
Figure 24B:
FIG. 24B is a fingerprint image in which a contrast of a ridge is emphasized.
Figure 24C:
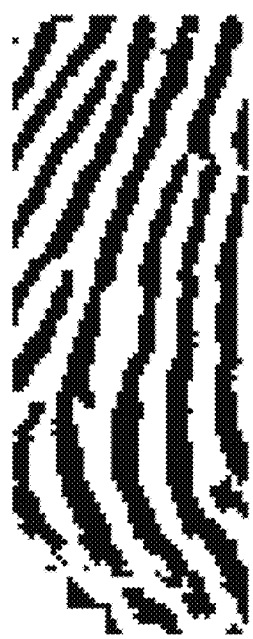
FIG. 24C is a binarized image of FIG. 24A.

Viewing a result of skeleton collation in FIG. 23, it is understood that the result is same as the result (FIG. 13) for the paired fingerprint. FIG. 24A is a result of area extraction of a non-paired fingerprint example, FIG. 24B is an image emphasized the ridge (contrast), and FIG. 24C is a binary image thereof.

Figure 25:
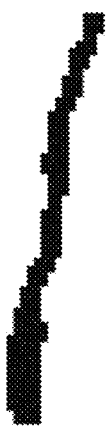
FIG. 25 illustrates a binary image being limited by a sandwiching skeleton.
Figure 26:
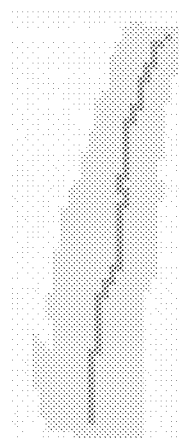
FIG. 26 is a diagram illustrating a virtual skeleton and a virtual feature point.

FIG. 25 illustrates a binary image limited by a sandwiching skeleton. Note that, the sandwiching skeleton is same as the result for the paired fingerprint. FIG. 26 illustrates a virtual skeleton and a virtual feature point. In this example, the virtual feature point is not extracted. Since there is no virtual feature point, there is no paired feature point of the opposite feature point pair. Therefore, in this case, the collation fails. When the collation fails, next, the image analyzing unit 13 analyzes the virtual skeleton and calculates an image analysis score (step S30). Analysis of the virtual skeleton is performed by comparison with the skeleton (original skeleton) of the feature extraction result of the imprinted fingerprint. The skeleton of the imprinted fingerprint to be collated is a skeleton inside the sandwiching skeleton, and is referred to as an inner skeleton.

Figure 27A:
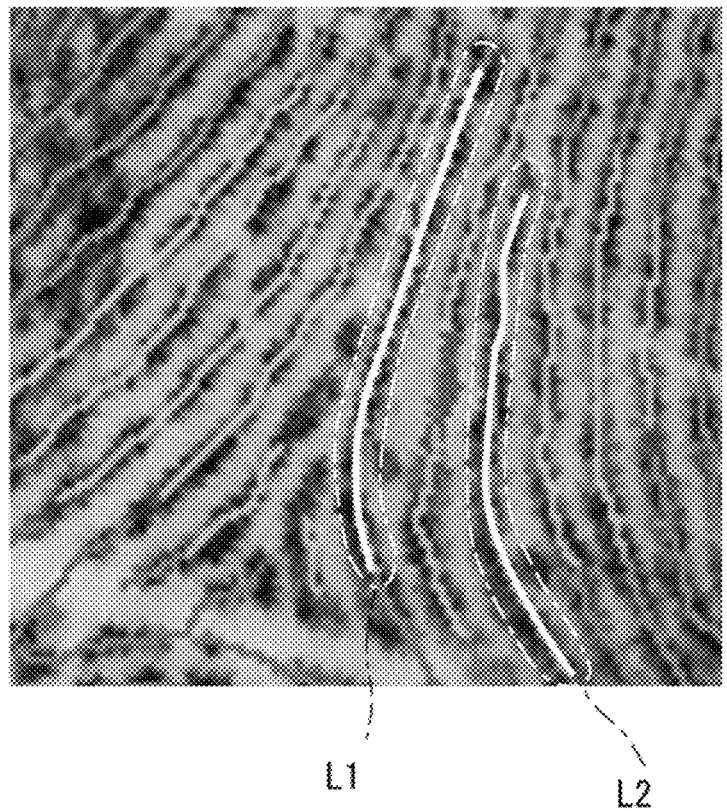
FIG. 27A is a diagram illustrating an associating skeleton of an imprinted fingerprint.
Figure 27B:
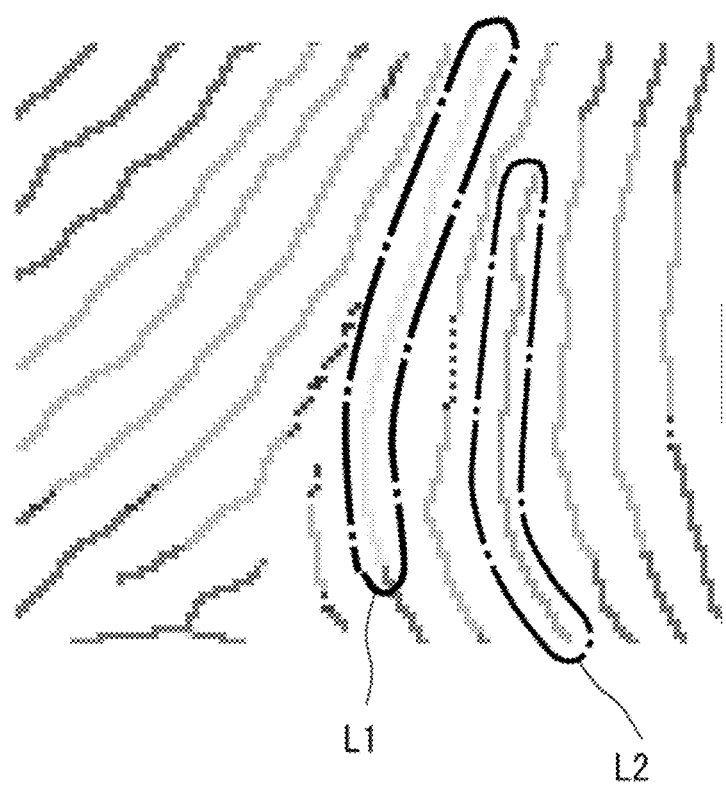
FIG. 27B is a diagram illustrating an associating skeleton of an imprinted fingerprint.
Figure 27C:
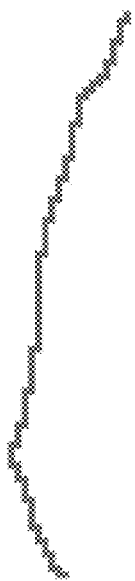
FIG. 27C is a diagram illustrating an inner skeleton.

FIGS. 27A and 27B are diagrams illustrating associating skeletons of the imprinted fingerprints. Herein, the associating skeletons indicated by L1 and L2 are sandwiching skeletons. The skeleton inside the sandwiching skeleton is the inner skeleton. In this case, it is a single skeleton illustrated in FIG. 27C.

Figure 28:
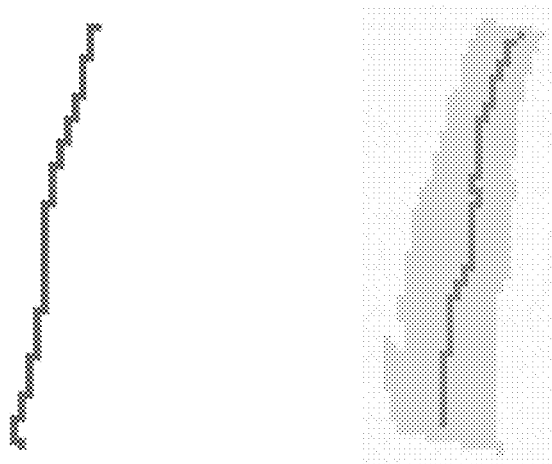
FIG. 28 is a diagram illustrating a virtual skeleton and an inner skeleton arranged side by side.

FIG. 28 illustrates a virtual skeleton and an inner skeleton arranged side by side. It is checked whether an inner skeleton exists in the vicinity of each pixel on the virtual skeleton. Specifically, pixels having no inner skeleton within about 5 pixels (about half of the ridge interval) in the vicinity of each pixel on the virtual skeleton are counted, and a ratio (this is difference ratio) of the number of the pixels to the total number of skeleton pixels is calculated. When the difference ratio is small (specifically, about 10% or less), it is determined that there is no ridge component associated with the opposite feature point pair, and therefore, an image analysis score having a negative value is set.

When the imprinted fingerprint to be checked is a true paired fingerprint, and the contrast of the ridge is emphasized by using the accurate ridge direction data and the accurate ridge interval data derived from the skeleton of the latent fingerprint, it is assumed that a virtual skeleton different from the original skeleton is extracted and the difference ratio also increases.

However, in a case where quality of the imprinted fingerprint image even as a true paired fingerprint is low (high noise), even when the contrast of the ridge is emphasized by using the accurate ridge direction data and the accurate ridge interval data, the difference ratio also increases when the skeleton is not accurately extracted. Therefore, when the difference ratio is large, the image analysis score is set to 0 point.

By installing, to a computer, a program causing to execute the above-described processing, the computer can function as a stripe pattern image collating device. Further, by causing a computer to execute the computer program described above, a stripe pattern image collating method can be executed by the computer.

Note that, the present invention is not limited to the above-described example embodiments, and can be appropriately modified within a range not deviating from the gist. In the plurality of flowcharts used in the above description, a plurality of steps (pieces of processing) are described in order, but the order of execution of the steps to be executed is not limited to the order described. For example, the order of the illustrated steps can be changed to the extent that there is no problem in content, such as executing each piece of processing in parallel. In addition, the above-described example embodiments can be combined within a range in which the contents do not conflict with each other.

REFERENCE SIGNS LIST

10 STRIPE PATTERN IMAGE COLLATING DEVICE
11 FEATURE EXTRACTING UNIT
12 SKELETON COLLATING UNIT
13 IMAGE ANALYZING UNIT
14 FEATURE CORRECTING UNIT
20 DISPLAY DEVICE
30 INPUT DEVICE
101 CPU
102 MEMORY
103 INPUT/OUTPUT INTERFACE
104 NIC

The invention claimed is:

1. A stripe pattern image collating device comprising:
at least one processor; and
at least one memory storing instructions executable by the at least one processor to:
extract a feature point and a skeleton from a first stripe pattern image and a second stripe pattern image in which a stripe pattern is formed of ridges, and generate feature point data and skeleton data;
collate two sets of pieces of the feature point data and pieces of the skeleton data that are extracted from each of the first stripe pattern image and the second stripe pattern image, and calculate a collation score; and
analyze the second stripe pattern image with respect to an area in which an opposite feature point pair of the first stripe pattern image exists, calculate an image analysis score, and correct the collation score,
wherein the opposite feature point pair comprises two feature points that are located in a vicinity of one another and that have opposite directions such that the two feature points face one another.

2. The stripe pattern image collating device according to claim 1, wherein the instructions are executable by the processor to further:
extract ridge direction data and ridge interval data from the skeleton data of the first stripe pattern image; and
emphasize, by using the ridge direction data and the ridge interval data, a ridge contrast of the second stripe pattern image having image distortion that has been corrected by using associating skeleton data of a result of skeleton collation.

3. The stripe pattern image collating device according to claim 2, wherein the instructions are executable by the processor to further:
limit an inside of an associating skeleton of the second stripe pattern image to a processing area when an outer skeleton determined to be outside the opposite feature point pair of the first stripe pattern image is the associating skeleton,
wherein the ridge direction data and the ridge interval data are extracted in the processing area.

4. The stripe pattern image collating device according to claim 3, wherein
the skeleton and the feature point are extracted, as a virtual skeleton and a virtual feature point, from the processing area when the outer skeleton determined to be outside the opposite feature point pair of the first stripe pattern image is the associating skeleton, and
the image analysis score is calculated by collating the virtual feature point with the opposite feature point pair.

5. The stripe pattern image collating device according to claim 4, wherein the image analysis score is calculated as having a positive value when determining that the virtual feature point is a paired feature point of the opposite feature point pair.

6. The stripe pattern image collating device according to claim 4, wherein the virtual skeleton is analyzed and the image analysis score is calculated when determining that the virtual feature point is not the paired feature point of the opposite feature point pair.

7. The stripe pattern image collating device according to claim 6, wherein analysis of the virtual skeleton is performed by comparison with the skeleton of the second stripe pattern image.

8. The stripe pattern image collating device according to claim 7, wherein
- an inner skeleton inside the associating skeleton of the second stripe pattern image is set as a collating target when the outer skeleton determined to be outside the opposite feature point pair of the first stripe pattern image is the associating skeleton, and
- the image analysis score is calculated according to a ratio of a number of pixels in which the inner skeleton does not exist within a predetermined range from each of a plurality of pixels on the virtual skeleton, to an number of pixels of the virtual skeleton.

9. A stripe pattern image collating method comprising:
- extracting, by a processor, a feature point and a skeleton from a first stripe pattern image and a second stripe pattern image in which a stripe pattern is formed of ridges, and generating feature point data and skeleton data;
- collating, by the processor, two sets of pieces of the feature point data and pieces of the skeleton data that are extracted from each of the first stripe pattern image and the second stripe pattern image, and calculating a collation score; and
- analyzing, by the processor, the second stripe pattern image with respect to an area in which an opposite feature point pair of the first stripe pattern image exists, calculating an image analysis score, and correcting the collation score,
- wherein the opposite feature point pair comprises two feature points that are located in a vicinity of one another and that have opposite directions such that the two feature points face one another.

10. A non-transitory computer-readable medium storing a program executable by a computer to perform:
- extracting a feature point and a skeleton from a first stripe pattern image and a second stripe pattern image in which a stripe pattern is formed of ridges, and generating feature point data and skeleton data;
- collating two sets of pieces of the feature point data and pieces of the skeleton data that are extracted from each of the first stripe pattern image and the second stripe pattern image, and calculating a collation score; and
- analyzing the second stripe pattern image with respect to an area in which an opposite feature point pair of the first stripe pattern image exists, calculating an image analysis score, and correcting the collation score,
- wherein the opposite feature point pair comprises two feature points that are located in a vicinity of one another and that have opposite directions such that the two feature points face one another.

* * * * *